Jan. 13, 1953  C. M. HINES  2,625,596
CIRCUIT CHECKING APPARATUS
Filed Aug. 22, 1950
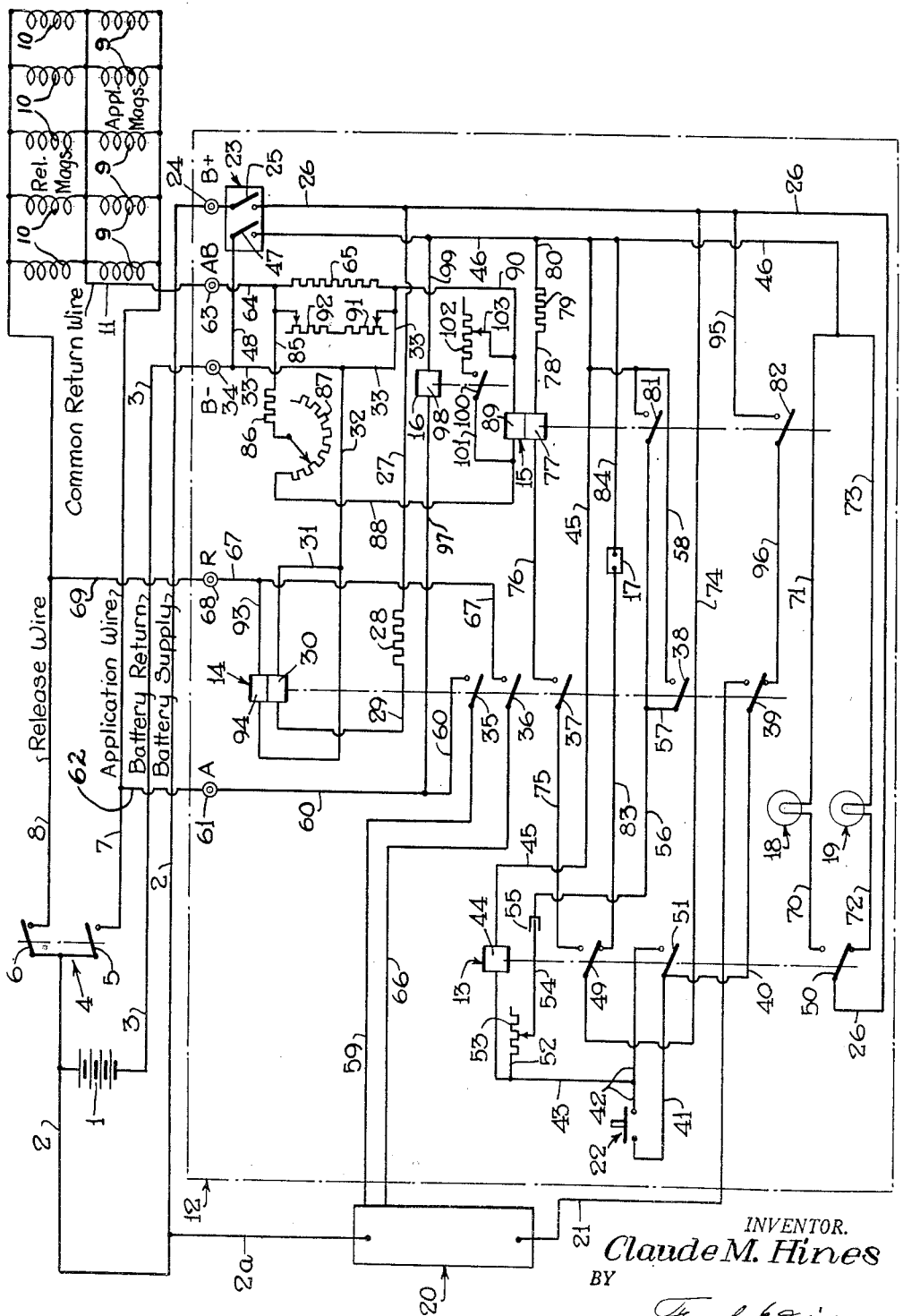
INVENTOR.
*Claude M. Hines*
BY
*Frank E. Miller,*
ATTORNEY Patented Jan. 13, 1953

2,625,596

UNITED STATES PATENT OFFICE 2,625,596

CIRCUIT CHECKING APPARATUS

Claude M. Hines, Verona, Pa., assignor to Westinghouse Air Brake Company, a corporation of Pennsylvania Application August 22, 1950, Serial No. 180,809

11 Claims. (Cl. 177—311)

This invention relates to circuit checking apparatus and more particularly, to apparatus adapted to be associated with control circuits of electro-pneumatic brake control systems, employed on a train of cars, for the purpose of selectively signalling integrity or lack of integrity of the said control circuits and accompanying electrical devices at all times.

The modern electro-pneumatic brake system for a train of cars, embodies a plurality of control circuits which extend throughout the length of the train from car to car, on which circuits operate brake control magnet valves located on each car. These magnet valves, of which there are usually two on each car, are called the "application magnet valve" and "release magnet valve," respectively, and are controlled by a common electro-pneumatic controller, called the master controller, which is normally located on the locomotive.

Various systems and methods have been employed for checking and indicating the integrity condition of the control circuits and associated magnet valves and electrical devices. One of such systems is described in United States Patent No. 2,573,442, issued October 30, 1951, which is assigned to the assignee of this invention.

The said Patent No. 2,573,442 discloses a checking and indicating apparatus which when used in conjunction with electro-pneumatic brake control system, enables a check of the integrity condition to be made of the control circuits and associated electrical devices, and also indicates such integrity condition to the train engineer.

In the above-mentioned application, an integrity check is made of both the application control circuit and the release control circuit by use of a Wheatstone bridge arrangement for each circuit, while the train brakes are released; and, while the train brakes are applied, an integrity check is made of the release control circuits by use of a current-responsive relay in the circuit. However, although such checking and indicating scheme satisfactorily checks and indicates the integrity condition of both the application control and release control circuits while the train brakes are released, it checks only the release control circuit and not the application control circuit while the train brakes are applied. Also, in the system disclosed in the said application, if a fault occurs in the release control circuit the instant immediately after application of the brakes is initiated, during which time both control circuits are energized simultaneously, the fault will go undetected until the master controller is restored to "lap" or "brake release" position.

It is an object of the present invention to provide an improved circuit checking system of the type disclosed in the above-mentioned pending application, characterized in that it includes means for checking the integrity of the control circuits and the associated electrical apparatus in such a manner as to indicate the occurrence of a fault in both the application and release control circuits not only while the brakes are released, but also during a brake application.

It is another object of my present invention to provide an improved circuit checking apparatus of the type referred to in the foregoing object and further characterized in that it includes means for checking the integrity of both the application and release circuits during brake application immediately upon initiation of such a brake application; and also during release of the brakes immediately upon initiation of such a brake release after a brake application.

The above objects together with other objects which will be made apparent in the subsequent description of my invention, are obtained by apparatus to be hereinafter described when read in connection with the accompanying drawings wherein the single figure depicts a simplified diagrammatic view of a circuit-checking and indicating apparatus as applied to the circuits of a simplified electric brake control system.

In the drawing, the simplified electric brake control apparatus comprises a source of direct current voltage, such as a battery 1, a supply wire 2, and a return wire 3, a master controller device shown herein as a two-pole master switch 4 having an application contact 5 and a release contact 6, the contacts 5 and 6 being connected respectively to the application wire 7 and the release wire 8 which extend throughout the train and to which are respectively connected the application magnet 9 and the release magnet 10 on each car of the train, and a common return wire 11.

It can be seen from the drawing that when switch 4 is positioned so that neither of its contact members are closed, a position referred to as the brake release position, the circuit to the magnets 9 and 10 is incomplete. When the switch 4 is positioned so that both contacts 5 and 6 are closed, a position referred to as the application position, both magnets 9 and 10 are energized. When only the release contact member 6 is closed, a position referred to as the "lap" position is defined in which the release magnets 10 only will be energized.

The circuit checking and indicating apparatus shown in the drawing is in simplified form and comprises a casing or panel 12 within which or to which are attached a single winding relay 13, a two-winding relay 14, a two-winding relay 15, and a single winding relay 16, each of these relays having contact members for interrupting or completing circuits which are described hereinafter.

This apparatus also comprises several indicating devices such as a bell or buzzer 17, an "all-clear" lamp 18, and a "fault" lamp 19 which operate in conjunction with the previously mentioned relays.

A bridge and coding cabinet 20 is shown which contains the Wheatstone bridge arrangements (not shown) and the coding arrangements (not shown) for checking the integrity of the control circuits during release as described and shown in detail in the previously mentioned Patent No. 2,573,442. For simplicity, this portion will be shown and described only as the cabinet 20 which functions to check the integrity of the control circuits during release and to supply a pulsating voltage from the battery supply 1 to a coding wire 21, which if so desired, may be more fully understood by reference to the mentioned pending application.

The checking and indicating apparatus also includes a push-button switch 22, a double-pole single-throw switch 23, and various wires, resistors and condenser connected and functioning as described hereinafter.

When the switch 4 is in its open or brake release position, the circuit checking apparatus operates as follows:

The operator first closes the switch 23 which establishes a circuit from the battery 1 by way of the battery supply wire 2 to a terminal post 24 in the casing 12, a contact member 25 of the switch 23, a B+ wire 26, a wire 27, a current limiting resistor 28, a wire 29, the lower winding 30 of relay 14, a wire 31, a wire 32, and a wire 33 to a B— terminal post 34, and thence to the battery 1 by way of battery return wire 3. The completion of this circuit causes the relay 14 to be energized to its picked-up position, thereby closing its contact members 35, 36, 37 and 38 and moving its contact member 39 to its upper closed position. With the contact member 39 in its upper closed position, the operator now closes the push-button switch 22, which establishes a circuit for energizing the relay 13 to its picked-up position.

The circuit for energizing relay 13 is traced from wire 21 which is subject to a pulsating D. C. voltage supplied by the apparatus (not shown) included in the cabinet 20, (as will be explained presently) to the closed contact member 39 of relay 14, wire 40, wire 41, the closed switch 22, wire 42, wire 43, the winding 44 of relay 13, wire 45, B— wire 46, the closed contact member 47 of the switch 23, wire 48, and wire 33, to the B— terminal post 34 and thence to the battery 1 by way of the battery return wire 3. The bridge and coding apparatus in the cabinet 20 operates to supply the mentioned pulsating D. C. voltage to wire 21 in response to energization of circuits from the battery 1. These circuits may be traced from the battery 1 by way of the battery supply wire 2, wire 2a, through the bridge and coding apparatus in the cabinet 20, wires 59 and 66 and the contact members 35 and 36 of relay 14 and wires 60 and 67 to the respective application and release wires 7 and 8 and thence through the respective control circuits to the common return wire 11, terminal post 63, wire 64, resistor 65, wire 33 and B— terminal post 34 and the battery return wire 3 to the battery 1.

As explained in the mentioned pending application the bridge and coding apparatus continues to operate to supply the said pulsating D. C. voltage to wire 21 as long as no fault exists in the control circuits.

The completion of the circuit for energizing relay 13 causes the relay 13 to be actuated to its picked-up position, thereby causing its contact members 49 and 50 to move to their upper closed positions, and its contact member 51 to move to its closed position. With the contact 51 of the relay 13 closed, the operator may now open the switch 22, thereby permitting the relay 13 to maintain its own "stick" circuit through the closed contact 51 which parallels switch 22 in the energizing circuit previously traced.

Connected in parallel with the winding 44 of relay 13 and energized simultaneously therewith is a circuit including wire 52, a resistor 53, wire 54, condenser 55, wire 56, wire 57, the closed contact 38 of relay 14, and wire 58 to wire 45. This circuit makes up a "loop" circuit with the winding 44 of relay 13 and serves to maintain the relay 13 energized for a short period of time by discharge of condenser 55 after the energizing circuit described in a previous paragraph is interrupted, for reasons to be described hereinafter.

The relay 13 remains energized in its picked-up position while the brakes are released so long as the bridge and coding equipment in the cabinet 20 delivers pulsating voltage of a certain frequency to the wire 21, which it will do while the integrity of the application and release control circuits are unimpaired. These control circuits are connected to the cabinet 20 in brake release respectively by way of wire 59 the closed contact member 35 of relay 14, wire 60, application terminal post 61, wire 62, application wire 7, and the application magnets 9 to the common return wire 11 which can be traced to the battery return wire 3 by way of terminal post 63, wire 64, resistor 65, wire 33 and B— terminal post 34; and by way of wire 66, closed contact member 36 of relay 14, wire 67, release terminal post 68, wire 69, release wire 8, and in parallel through the release magnets 10 to the common return wire 11, which can be traced to the battery return wire 3 and a similar wire 11 which can be traced to the battery return wire 3 in a similar manner.

As long as relay 13 remains energized, the contact member 50 remains in its upper closed position, thus completing a circuit for energizing the "all-clear" lamp 18, which circuits extend from the B+ wire 26, through contact member 50, wire 70, lamp 18, and wire 71 to the B— wire 46. However, if for any reason the relay 13 becomes deenergized, the contact member 50 will assume its lower closed position and establish a circuit for energizing the "fault" lamp 19, which circuit may be traced from the B+ wire 26, by way of contact member 50, wire 72, lamp 19, and wire 73 to the B— wire 46. An explanation of these just described circuits will appear hereinafter.

When the relay 13 is energized, the contact member 49 is effective in its upper closed position to establish a circuit which may be traced from the B+ wire 26, by way of wire 74, contact member 49, wire 75, closed contact member 37 of relay 14, wire 76, the lower winding 77 of the relay 15, wire 78, current limiting resistor 79, and wire 80 to the B— wire 46. The energization of this circuit results in the actuation of the relay 15 to its picked-up position, thereby causing the contact members 81 and 82 to move to their respective closed positions for purposes applicable during brake application as will be explained hereinafter. If for any reason the relay 13 becomes deenergized, the contact member 49 will assume its lower closed position, thus completing a circuit for energizing a buzzer 17 by way of the B+ wire 26, wire 74, contact member 49, wire 83, buzzer 17, and wire 84 to the B— wire 46 for a purpose described hereinafter.

The circuits described thus far, with but a few exceptions, are in use during the normal conditions of the circuit checking and signalling with the brakes released (switch 4 open with both contacts 5 and 6 open) and no fault existing in the battery supply or in the control circuits.

The circuit checking and signalling apparatus operates during a brake application as follows:

Assuming no faults are present, the brakes are applied by operation of the master controller device or switch 4, in the usual manner. As can be seen from the drawing, operation of said switch 4 causes the release contact 6 to be closed an instant or so before the application contact 5 is closed. When the release contact 6 is closed, a circuit is completed for energizing the release magnets by way of the release wire 8, the parallel connected release magnets 9, the common return wire 11, terminal post 63, wire 64, resistor 65, wire 33 and B— terminal post 34 to the battery return wire 3. As this circuit is completed, another circuit is energized by utilizating the voltage-drop across the potentiometer resistor 65, said circuit being in parallel with the resistor 65 by connection to wire 64 and including a wire 85, a current-limiting resistor 86, an adjustable resistor 87 which is varied according to train length as will be explained later, a wire 88, the upper winding 89 of relay 15 and wire 90 to wire 33. Also in parallel with the resistor 65 are two variable resistors 91 and 92 adjusted to a predetermined value for varying the voltage-drop across resistor 65. The adjustable resistor 87 is so adjusted for a particular train length and thus for a corresponding number of magents in the release control circuit that with no faults in the release control circuit, the current delivered to the windling 89 of relay 15 is just sufficient to maintain the relay 15 picked-up. However, when a fault occurs in the release control circuit, the current delivered to said winding of said relay is insufficient to maintain relay 15 picked-up.

Simultaneously with the energization of the release control circuits, a circuit is completed for energizing the top winding 94 of relay 14 from the release wire 8 by way of wire 69, release terminal post 66, wire 67, wire 93, winding 94 of relay 14, wire 32, wire 33, and B— terminal post to the battery return wire 3. It will be noted that the bottom winding 30 of relay 14 is also energized as was previously described, but the energization of the top winding 94 opposes the energization of the bottom winding. The opposing energization of the two windings causes the relay 14 to be returned to its dropped-out position in which the contact members 35, 36, 37 and 38 are opened and the contact member 39 is moved to its lower closed position.

When the contacts 35 and 36 are restored to their open position, the circuits connecting the bridge arrangements in the cabinet 20 to the control circuits are interrupted, thus causing the bridge and coding equipment in the cabinet 20 to discontinue the supply of pulsating D. C. voltage to the wire 21.

The contact member 39 of relay 14 is effective when moved to its lower closed position to establish a circuit for maintaining the relay 13 in its picked-up position, which circuit extends from the B+ wire 26, by way of wire 95, the closed contact member 82 of relay 15, wire 96, contact member 39, wire 40, contact member 51 of relay 13, wire 42, wire 43, the winding 44 of relay 13 and wire 45 to the B— wire 46. During the interval in which the contact member 39 moves from its upper closed position to its lower closed position, the relay 13 is maintained energized by the current discharging from condenser 55 through the loop circuit including wire 54, resistor 53, wire 52, wire 43, the winding 44 of relay 13, wire 45, wire 58, the contact member 81 of relay 15 and wire 56.

Contact member 37 is effective when restored to its open position to interrupt the circuit previously described for energizing the lower winding 77 of relay 15, thus deenergizing the lower winding of relay 15. However, as previously described, the relay 15 will not drop-out because the upper winding 89 will remain energized and thereby maintain the relay in its picked-up position as long as no fault exists in the control circuits.

Contact member 38 is effective, when opened to interrupt the loop circuit giving the time delay to relay 13 before dropping-out as previously discussed, with the result that drop-out of relay 13 will occur without delay if the relay 15 drops out due to a fault occurring on the control circuits while the brakes are applied.

An instant after the closing of the release contact 6 of the master controller or switch device 4, the application contact 5 is closed for energizing the application magnets 9. Closing of the application contact 5 establishes a circuit for energizing the winding 98 of relay 16 which is thereby actuated to its picked-up position, this circuit being traced from the application wire 7, wire 62, the application terminal 61, wire 60, wire 97, the winding 98 of the relay 16, wire 99, B— wire 46, the contact member 47 of the switch 23, wire 48, wire 33, B— terminal post 34 and the battery return wire 3. Upon energization of relay 16 the contact member 100 of said relay is moved to its closed position thus completing a shunt circuit across the winding 89 of relay 15. This shunt circuit, which includes a wire 101, contact member 100 of relay 16, variable resistor 102, and wire 103, decreases the effective ampere turns of the winding 89 by shunting current from winding 89. However, due to the increased current supplied to energize the application magnets 9, the current through winding 89 will be maintained at a degree sufficient to keep relay 15 picked-up, unless a fault occurs on either the application or the release control circuits. The circuit for energizing the application magnets 9 is completed by way of the application wire 7, the magnets 9, the common return wire 11, terminal post 63, wire 64, resistor 65, wire 33, B— terminal post 34, and the battery return wire 3. Thus the sum of the currents in the release control circuit and in the application control circuit produces voltage-drop across the resistor 65. The winding 89 of relay 15 being connected in parallel with the resistor 65 is thus subject to the greater voltage-drop across resistor 65 to maintain the current through winding 89 equal to the current existing when the shunt circuit across winding 89 is not established. In this manner, the relay 15 is maintained picked-up while both the application control circuits and the release control circuits are energized, unless a fault occurs in either control circuit, in which case the current through the winding 89 is decreased sufficiently to effect a drop-out of relay 15.

When the application control circuit is again deenergized while the release control circuit remains energized, consequent upon automatic return of the master switch 4 to its lap position, the relay 16 simultaneously drops-out due to interruption of the described shunt circuit across winding 89 of relay 15, and the conditions existing then will be as previously described when only the release control circuit is energized.

In view of the description of my invention thus far, an explanation of the operation of this apparatus when the master switch 4 is in each of its respective operating conditions will follow, that is, in brake release (contacts 5 and 6 of switch 4 open), the initiation of a brake application (contact 6 closed and contact 5 open), full application (both contacts 5 and 6 closed), lap position (contact 6 closed and contact 5 open), and release after application (both contacts 5 and 6 open).

In brake release position of the master switch 4, with no faults present on the control circuits, the lower winding 30 of relay 14 is energized to its picked-up position by voltage from the B+ wire 26 thus connecting the bridge and coding equipment in cabinet 20 to the control circuits and enabling a delivery of pulsating voltage to wire 21. The relay 13 is energized to its picked-up position by the pulsating D. C. voltage from wire 21, thus completing a circuit for energizing the all-clear lamp 18, and also completing a circuit for energizing the lower winding 77 of relay 15 to its picked-up position. Should a fault occur in either or both the application or release control circuits, the corresponding bridge arrangements (not shown) in cabinet 20 became unbalanced and cease to supply pulsating voltage to wire 21, as explained fully in Patent No. 2,573,442. With the supply of voltage to wire 21 interrupted the relay 13 would drop-out and move contacts 49 and 50 to their respective lower closed positions for completing circuits for energizing the buzzer 17 and energizing the "fault" lamp 19 to indicate a fault to the operator. After the fault has been found and corrected in the manner fully explained in my above mentioned pending application, the checking and indicating apparatus may be set in operation again by closing the push button switch 22 which will again effect energization of relay 13 if the pulsating voltage supply has been restored to wire 21.

When a brake application is first initiated and only the release contact member 6 of the switch 4 is closed with no faults present, the top winding 94 of the relay 14 is energized by voltage from the release wire 8, in opposition to the already energized lower winding 30, thus causing a dropping-out of relay 14. Also, the upper winding 89 of relay 15 is energized by the voltage-drop across resistor 65 which is effected by the energization of all the release magnets 10 thus maintaining relay 15 picked-up. The dropping-out of relay 14 disconnects the control circuits from the bridge and coding equipment in case 20 at contact members 35 and 36 and thus effects an interruption of the pulsating voltage delivered to wire 21. The dropping-out of relay 14 also effects an interruption of the circuit for energizing the lower winding 77 of relay 15 at the contact member 37, but, as previously mentioned, the upper winding 89 will maintain the relay 15 picked-up. The dropping-out of relay 14 also moves the contact member 39 to its lower closed position to complete an alternate circuit for maintaining the relay 13 energized with voltage supplied from B+ wire 26 and the contact 82 of relay 15. During the time in which the energizing voltage of relay 13 is being changed from the pulsating source on wire 21 to the battery supply on wire 26, the current discharging from condenser 55 will maintain the relay 13 energized for a short time interval by way of the loop circuit previously described. Should a fault occur in the release control circuits in this short time interval in which only the release control circuit is energized upon initiation of a brake application, the voltage-drop across the resistor 65 will decrease, resulting in a sufficient decrease in the current energizing the top winding 89 of relay 15 to allow the relay 15 to drop-out as previously explained. With the dropping-out of relay 15, the circuit for energizing relay 13 will be interrupted thus dropping-out the relay 13 and moving the contact members 49 and 50 of relay 13 to their lower closed position to complete circuits for energizing the buzzer 17 and the lamp 19 to indicate the fault to the operator.

When the brakes are applied and both the release contact member 6 and the application contact member 5 of the switch 4 are closed, both the application and release circuits are energized. The relays 13 and 14 remain energized in the same manner as described in the previous paragraph when only the release contact member 6 of switch 4 was closed. In addition, the relay 16 is energized to its picked-up position by voltage from the application wire 7. The upper winding of relay 15 remains energized, but energized in this instance by the voltage-drop across resistor 65 effected not only by energization of all the release magnets 10 as in the previous paragraph, but by the voltage-drop across resistor 65 effected by energization of all of both the release magnets 10 and the application magnets 9. This resulting increase in voltage-drop across resistor 65 causes an increase of current for energizing the winding 89 of relay 15 such that the current maintaining relay 15 picked-up is greater than that required. However, as relay 16 is also energized and picked-up, the contact member 100 of said relay in closing completes a shunt circuit for by-passing this excess current through the winding 89 of relay 15 in such a manner that when no fault occurs on either control circuit, the current to the winding 89 is just sufficient to maintain relay 15 picked-up. Should a fault occur on either control circuit, the current to winding 89 of relay 15 would decrease sufficiently to allow relay 15 to drop-out, thus interrupting the circuit for energizing relay 13 and causing relay 13 to drop-out. With relay 13 dropped-out, the contact members 49 and 50 move to their respective lower closed positions, thus completing circuits for energizing buzzer 17 and lamp 19 to indicate a fault to the operator.

When the brakes have been applied and the master controller goes to "lap" position with the release contact member 6 closed and the application contact member 5 open again, the relay 16 will become deenergized because the application control circuit is deenergized. The checking and indicating apparatus will thus again be conditioned exactly as it was described in the previous paragraph describing the condition of the apparatus when the brake application is first initiated with only the release control circuits energized.

When the master switch 4 is restored to brake release position from its brake application position, the top winding of relay 14 is deenergized allowing the energized lower winding 30 to cause the contact members of said relay to pick-up thus placing the bridge and coding cabinet 20 in the connected control circuits back in operation and supplying pulsating voltage for energizing relay 13 by way of wire 21. Also, the lower winding 77 of relay 15 is again energized with the closing of contact member 37 of relay 14 before the top winding 89 is deenergized due to deenergization of the release control circuit. Relay 15 is thus maintained picked-up. Thus, the condition of the checking and indicating apparatus is returned to the conditions existing described in the previous paragraph for brake release.

It should be noted here that regardless of the brake control position, if the battery supply circuit is interrupted, this faulty indication will be noted by the operator due to the fact that both the indicating lamp 18 and 19 will be deenergized.

It should be understood that while my invention has been disclosed specifically in connection with two control circuits it is not limited in its operation to two control circuits, but may be adapted to operate with any number of control circuits.

Having now described my invention, what I claim as new and desire to secure by Letters Patent, is:

1. Apparatus for checking the integrity of a plurality of control circuits that are adapted to be selectively energized for effecting different control functions, said apparatus comprising a first means for detecting the integrity of said circuits while they are deenergized, a second means for detecting the integrity of one circuit of said circuits while only said one circuit is energized, a third means for detecting the integrity of all of the circuits while all of said circuits are energized and means responsive to deenergization of all of the circuits to render said first means effective, and responsive to energization of one and of all of said circuits to render said second means and said third means effective, respectively.

2. Apparatus for checking the integrity of a plurality of control circuits that are adapted to be selectively energized for effecting different control functions, said apparatus comprising a first means for detecting the integrity of one circuit of said circuits while only said one circuit is energized, and means responsive to energization of another of said circuits for rendering said first means effective also to detect the integrity of all of the energized of said circuits.

3. Apparatus for checking the integrity of a plurality of control circuits that are adapted to be selectively energized for effecting different control functions, said apparatus comprising integrity detecting means, and means responsive to energization and deenergization of a certain one of said circuits to selectively condition said detecting means to detect the integrity of one circuit of said circuits while only said one circuit is energized, and to detect the integrity of more than one of said circuits while such circuits are energized.

4. For use in connection with a plurality of control circuits adapted to be selectively energized for effecting different control functions, apparatus comprising a first means operative to detect the integrity of all of said circuits while all are deenergized, a second means operative to detect the integrity of one circuit of said circuits while only said one circuit is energized, a third means operative to detect the integrity of all of said circuits while all of said circuits are energized, signal means operable to indicate circuit integrity status, and means responsive to energization conditions of said control circuits to establish operative connection selectively between said signal means and said first means, said second means, and said third means.

5. Apparatus for checking the integrity of a plurality of control circuits that are adapted to be selectively energized for effecting different control functions, said apparatus comprising a first means for detecting the integrity and lack of integrity of one circuit of said circuits while only said one circuit is energized, signal means operable by said first means to indicate both circuit integrity and lack of circuit integrity, and means responsive to energization of another of said control circuits to render said first means effective to detect integrity and lack of integrity of all of the energized of said circuits.

6. Apparatus for checking the integrity and lack of integrity of two different circuits that are adapted to be selectively energized for a desired control purpose, said apparatus comprising a first means for detecting the integrity and lack of integrity of one circuit of said circuits while energized for control purposes, a second means for detecting the integrity and lack of integrity of the other circuit of said circuits while energized for control purposes, identical signal means controlled by said first and said second means, for indicating the integrity and lack of integrity of either one or both of said circuits, and means responsive to energization and deenergization of one of said circuits for controlling the effectiveness of said first means and said second means.

7. For use in connection with two vehicle brake control circuits, the combination of a first means for detecting the integrity of the brake control circuits while deenergized to effect release of the brakes, a second means for detecting the integrity of one circuit of said brake control circuits while energized to hold a brake application, a third means for detecting the integrity of both of said brake control circuits while energized to initiate a brake application, a first selecting means responsive to the energization of said one circuit to render said first means ineffective and said second means effective, and responsive to the de-energization of said one circuit to render said first means effective and said second means ineffective, a second selecting means responsive to the energization of the other circuit of said brake control circuits to render said second means ineffective and said third means effective, and responsive to the de-energization of the said other circuit to render said third means ineffective and said second means effective.

8. Apparatus for detecting the integrity and lack of integrity of two control circuits having a common return wire and so arranged that one or both of said circuits are selectively energized, said apparatus comprising electro-responsive relay means adapted to remain picked up so long as it is energized by a current exceeding a certain value and dropped-out when the energizing current reduces below said value, and means responsive to energization and deenergization of one of said circuits for causing said electro-responsive relay means to be energized in substantially the same degree above said certain value for a no-fault condition of one or both of said circuits whether said one or both of said circuits are energized.

9. Apparatus for signalling the integrity and lack of integrity of two control circuits having a common return wire and arranged so that one or both of said circuits are selectively energized, said apparatus comprising electro-responsive relay means energized according to the current in said return wire, resistance means, a relay responsive to energization of one of said circuits for connecting said resistance means in parallel with said electro-responsive relay means thereby to cause said electro-responsive relay means to drop-out responsively to reduction of the energizing current below a certain value incident to the occurrence of a fault on said circuits whether one or both of said circuits are energized.

10. Apparatus for checking the integrity status of a control circuit adapted to be selectively energized in a first degree and in a greater degree, said control circuit including a plurality of controlled elements connected electrically in parallel such that interruption in electrical connection between said elements will result in a decrease in current flowing through said control circuit, said apparatus comprising relay means responsive to reduction in current below a certain value to establish a condition indicative of a faulty control circuit; rheostat means to regulate current from said control circuit in supply to said relay means such that said current will be in slight excess of said certain value when said control circuit is intact and energized in said first degree; resistance means adapted to be rendered effective to so limit current from said control circuit in supply to said relay means as to assure that said current will remain in only slight excess of said certain value when said control circuit is intact and energized in said greater degree; and means responsive to energization of said control circuit in said first degree and in said greater degree to render said resistance means ineffective and effective, respectively.

11. The combination with a source of electrical energy, a number of first electrical elements connected in parallel, a number of second electrical elements connected in parallel, a first control wire connected to the input to said first electrical elements, a second control wire connected to the input to said second electrical elements, a return wire connected to the output from both the first and second electrical elements and also connected to the negative terminal of said source of electrical energy, and operator's switch means operable selectively to connect to said source either said first control wire or both said first control wire and said second control wire, of first resistance means connected in series with said return wire, relay means having a connection across said resistance means to receive a certain proportion of current from said return wire, said relay means being responsive to a reduction in receipt of current via said connection below a certain value to establish a condition indicative of a faulty control circuit, rheostat means in said connection and in series with said relay means to so regulate current to said relay means such that said current will be in slight excess of said certain value when the control circuit is intact and said first control wire only is connected to said source; second resistance means adapted for a parallel connection with said relay means to assure that current to said relay means will remain in only slight excess of said certain value when said second control wire also is connected to said source, and other relay means responsive to establishment and disestablishment of current flow in said second control wire to establish and disestablish, respectively, said parallel connection.

CLAUDE M. HINES.

REFERENCES CITED

The following references are of record in the file of this patent:

UNITED STATES PATENTS

| Number | Name | Date |
|---|---|---|
| 2,276,706 | Sorensen | Mar. 17, 1942 |
| 2,478,000 | Miller | Aug. 2, 1949 |